Patented July 29, 1952

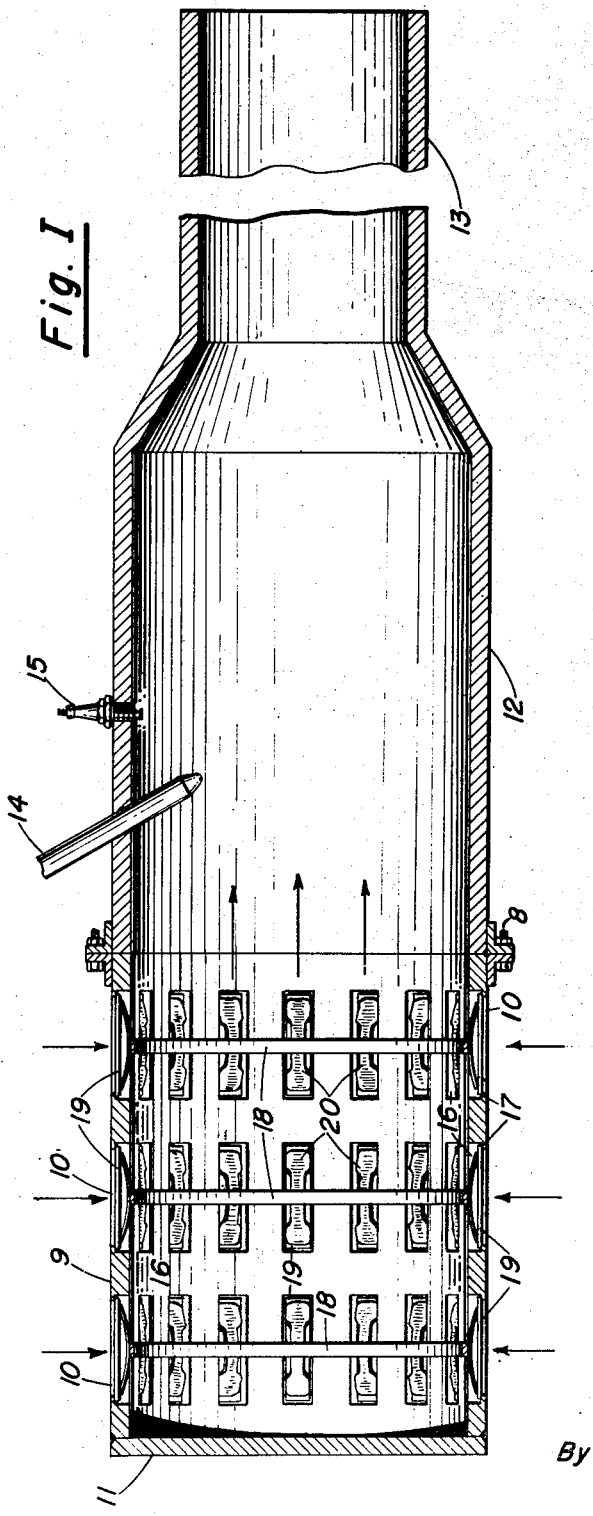
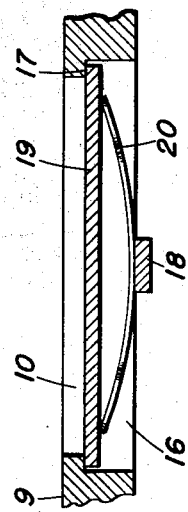
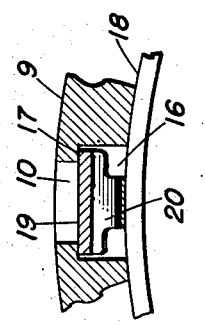

2,605,109

UNITED STATES PATENT OFFICE 2,605,109

AIR INLET VALVE FOR CYCLICALLY OPERATING JET MOTORS

Elman B. Myers, Pompton Plains, N. J.

Application February 15, 1946, Serial No. 647,960

1 Claim. (Cl. 277—60)

This invention relates to an improvement in air inlet valves for jet motors that operate cyclically.

An object of this invention is to provide an air inlet valve for a cyclically operated jet motor that is positive in action and is provided with individually removable valves.

Other objects and advantages of this invention will become apparent as the discussion proceeds and is considered in connection with the accompanying claim and drawings wherein like characters of the reference designate like parts throughout, and wherein:

Fig. I is a longitudinal section view of the assembled valve embodied in this invention, carried by the combustion chamber of a conventional reso-jet motor;

Fig. II is a cross-sectional view of the port, valve, and spring insert of the inlet valve as embodied in this invention; and Fig. III is a longitudinal section view of the port, valve, and spring shown in Fig. II.

Referring now to the drawings, wherein for the purpose of illustration only, is shown a preferred embodiment of this invention, the numeral 9 designates a cylindrical valve cage or housing having a plurality of rectangular openings or ports 10, disposed circumferentially and longitudinally at spaced intervals around the cage 9. The cage 9 is provided on one end with a closure plate 11, welded as shown or held in place by studs or the like (not shown). The opposite end of the cage 9 is open and is affixed by flange bolts 8 or the like to a combustion chamber 12 of a conventional jet motor having a conventional tail pipe 13, fuel inlet 14, and igniter 15, as shown.

Each of the ports 10 is partially milled for a portion of its depth, as shown in Figs. II and III, to provide a channel 16 and a valve seat 17. The back or inside portion of the port is provided with a bridge 18. An insert valve 19, machined to work freely in the milled channel 16 and seat against the valve seat 17 is provided in the port 10, as shown. The insert valve 19 is likewise made of such a thickness as will permit insertion into and removal from the channel by sliding under the bridge 18. To provide a more positive seat for the said valve port, the seat 17 and the valve 19 are curved with the same radius as that of the cage 9. The spring 20, as shown in Figs. II and III, holds the insert valve 19 in place by bearing against the back of the insert valve 19 at both ends and the bridge 18 in the middle.

In operation, air is drawn in through the valve cage 9 when a negative pressure occurs in the combustion chamber 12. The air then passes from the cage into the combustion chamber as indicated by the arrows shown in Fig. I. The valve insert 19 and spring 20 are made removable so that they can be individually replaced without removing any of the other valves when pitting and scoring occurs. To remove the valve, the spring 20 is removed by a key or thin tool (not shown) and the insert 19 is then forced out by applying pressure against the same from the outside of the cage.

It is to be understood that the form of this invention herewith shown and described is to be taken as a preferred example of the same, and that various changes in the shape, size and arrangement of parts may be resorted to without departing from the spirit of this invention or the scope of the subjoined claim.

What is claimed is:

In a jet motor, an elongated tubular housing having one end closed and the other end adapted to open into the combustor of the motor, said housing having a plurality of air inlet ports disposed in one or more circular rows circumferentially of said housing, an individually removable valve insert adapted to be placed in each of said ports, said inserts being arranged to positively open and close said ports during cycles of positive and negative pressure in said housing, an annular bridge ring in said housing traversing said circular row of ports at their midsections, said ring dimensioned relative to said ports to provide relatively large air passages on either side of said ring, and a curved spring in each of said ports biased between said valve insert and said ring to normally close said port, the ends of said spring bearing on said valve insert and its curved center section bearing on said ring, the chord of said spring being of less length than its associated port whereby it may be flattened and removed with its associated valve insert through either one of said air passages adjacent said ring without disturbing the rest of the inserts.

ELMAN B. MYERS.

REFERENCES CITED

The following references are of record in the file of this patent:

UNITED STATES PATENTS

| Number | Name | Date |
| --- | --- | --- |
| 1,490,049 | Wainwright | Apr. 8, 1924 |
| 1,653,391 | Corless | Dec. 20, 1927 |
| 1,955,007 | McClay | Apr. 17, 1934 |
| 1,962,072 | Haight | June 5, 1934 |
| 1,983,405 | Schmidt | Dec. 4, 1934 |
| 2,408,056 | Farmer | Sept. 24, 1946 |
| 2,420,056 | Selingman | Mar. 6, 1947 |
| 2,432,213 | Rutishauser | Dec. 9, 1947 |

FOREIGN PATENTS

| Number | Country | Date |
| --- | --- | --- |
| 374,124 | France | of 1907 |
| 640,228 | Germany | of 1936 |